Dec. 7, 1926.                                                          1,609,450
C. C. VAN NUYS
LIQUEFACTION AND RECTIFICATION OF GASES
Filed Dec. 2, 1919
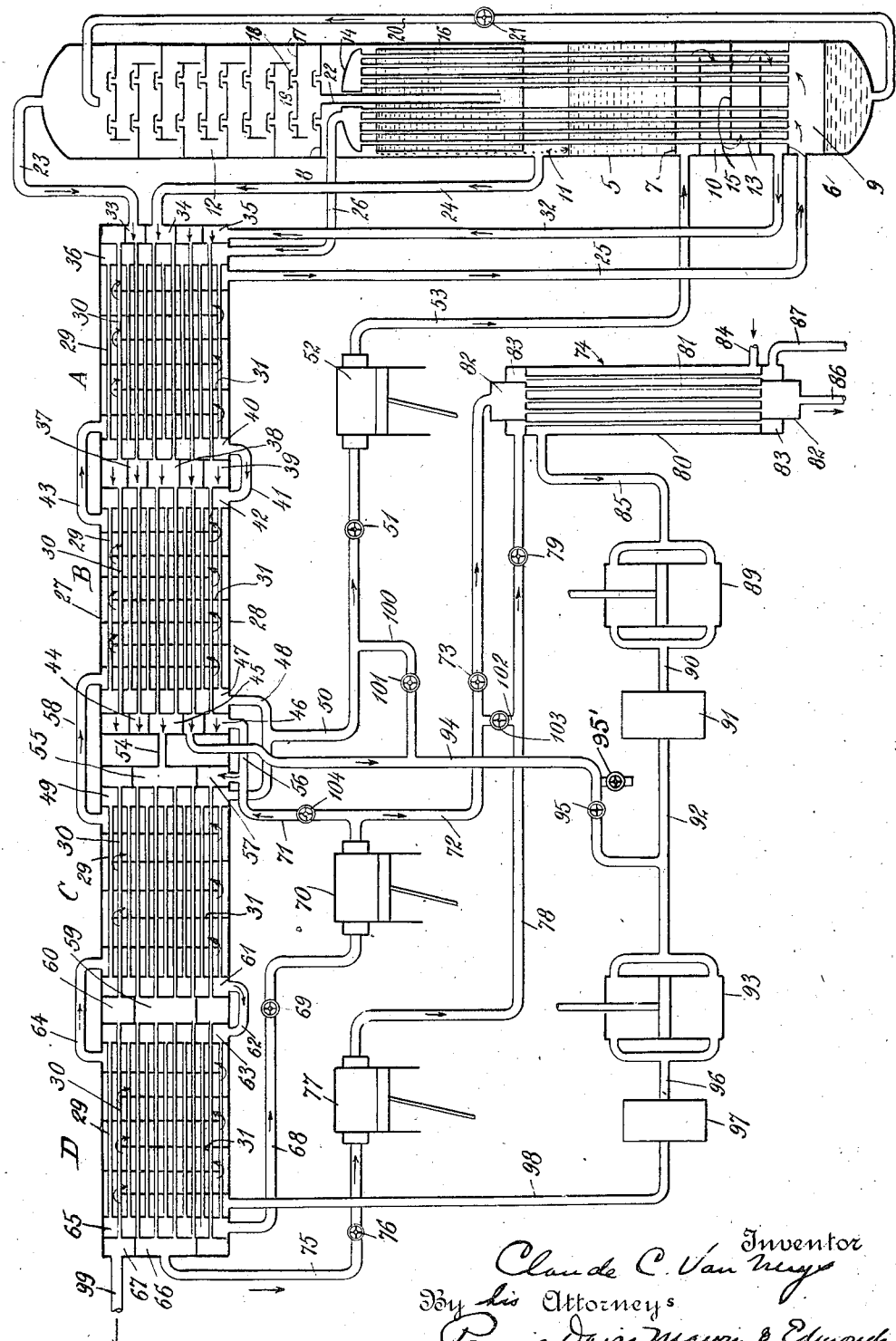

Patented Dec. 7, 1926.

1,609,450

UNITED STATES PATENT OFFICE.

CLAUDE C. VAN NUYS, OF NEW YORK, N. Y., ASSIGNOR TO AIR REDUCTION COMPANY, INC., A CORPORATION OF NEW YORK.

LIQUEFACTION AND RECTIFICATION OF GASES.

Application filed December 2, 1919. Serial No. 341,958.

This invention relates to the liquefaction and separation of gases in gaseous mixtures, and particularly to the accomplishment of such separation in the most economical manner for the purpose of recovering the constituent gases.

It has been proposed heretofore, and commercial methods are now operated, to separate the constituent gases of a mixture, for example, atmospheric air, by liquefaction and subsequent rectification. Methods, as heretofore practiced have, however, a relatively low efficiency, when compared to the theoretical possibilities, and it is with the object of increasing the efficiency and, therefore, the economy of liquefaction methods that I have undertaken extensive study of the fundamental requirements thereof.

The work required to separate the constituents of a gaseous mixture by liquefaction is made up of certain fundamental components which are, first, the work of separating the molecules of the constituent gases and bringing the partial pressures of the respective constituents, when separated, up to atmospheric; second, the work required to remove heat leaking into the system from external sources and, third, the mechanical losses of the system. The first component is a constant for given mixtures of gases, and the second and third depend upon efficiency of insulation and of the mechanical devices employed. Practically, however, a relatively enormous component has been added to the total energy expended in liquefaction and rectification of gaseous mixtures as a result of irreversible pressure drops, which have heretofore been considered unavoidable.

It is the object of my invention to substantially eliminate the latter component, thereby approaching more closely the theoretical limit of efficiency in the separation of constituent gases of a mixture, and to provide an apparatus for the accomplishment of this purpose, thus cheapening the product and rendering it available for extended usage.

A further object of my invention is the introduction of numerous novel features in a liquefaction and rectification operation, which render it more nearly automatic and avoid losses which have heretofore reduced the efficiency of such operations.

Other objects of my invention are the provision of a method of separating the constituent gases of a mixture which permits the withdrawal of the constituents in substantial purity, a result which has heretofore been impossible, because under prior methods one gas is necessarily contaminated with the other to insure relative purity of the latter gas, and the "cycling" of the unseparated residual mixture, so that the constituents of all of the mixture are eventually separated, thus avoiding losses which have heretofore arisen as a result of discharging large volumes of gas without separation, after the pressure thereon has been released, with consequent loss of available energy.

Another object of the invention is the reduction of the total energy consumed in separating the constituents of a gaseous mixture by expanding the gases leaving the apparatus with the recovery of energy and the cooling of the mixture before compression to reduce the initial energy required.

These and other objects and advantages of the invention will be more clearly understood by reference to the following specification, when read in connection with the accompanying drawing, in which I have diagrammatically illustrated one form of apparatus adapted for use in carrying out my invention, it being understood that, for the purpose of clarity, no attempt has been made to illustrate details of construction and that the apparatus is subject to rearrangement and modification, without departing substantially from the principles hereinafter set forth.

In order that my invention and the distinctive features thereof may be appreciated, I shall outline briefly the normal operation of a commercial oxygen apparatus, according to a well known method, described in Letters Patent No. 981,748. Thus, atmospheric air is compressed to a pressure of substantially thirty atmospheres in a two-stage compressor provided with intercoolers and aftercoolers supplied with water, and is thereafter cooled in temperature exchangers by indirect contact with gases resulting from the separation. A portion of the cooled air is conveyed to a liquefier and is cooled therein by indirect contact with the cold separated gases, before the latter pass to the exchangers. The liquid produced in the liquefier is conveyed past a pressure reducing valve to a pot at the base of a rectification column. The other portion of the cooled air is conveyed to an expansion engine, where it is cooled, by expansion with external work to a pressure of four to five atmospheres, which is the pressure prevailing in the lower part of the column. The cooled air from the engine passes into the pot, heretofore referred to, and thence upwardly through tubes of a vaporizer which contains liquid oxygen resulting from rectification, as hereinafter described, and which is evaporating at a somewhat lower pressure than that of the air in the tubes. Oxygen and some nitrogen are liquefied in the tubes and return to the pot, mixing with the liquid delivered from the liquefier. The pot is divided into two compartments, in one of which the liquid accumulates as described. The second compartment is connected to a series of tubes, through which the uncondensed residu of the incoming air, being substantially pure nitrogen, passes downwardly in indirect contact with liquid oxygen, in the vaporizer. The nitrogen is thereby liquefied and accumulates in the second compartment.

From the first compartment, the liquid rich in oxygen is conveyed upwardly through a pipe, having a pressure reducing valve, and is discharged into the rectification compartment of the column, which is provided with a series of trays, holding a supply of liquid through which ascending vapor bubbles with resulting progressive enrichment of the vapor in nitrogen. Since the pressure in the vaporizer at the base of the column must be released sufficiently to enable the liquid oxygen contained therein to liquefy the substantially pure nitrogen, circulating in the tubes connected to the second compartment, "throttling" of the liquid by means of the pressure reducing valve must be resorted to, and this causes an irreversible pressure drop and a serious loss in efficiency as hereinafter explained. The liquid nitrogen from the second compartment is conveyed through a similar pipe and pressure reducing valve into the column and is discharged at a point above the inlet for liquid rich in oxygen. The liquid nitrogen must also be "throttled" down to the pressure prevailing in the rectification compartment with a corresponding loss in efficiency. Gaseous oxygen is withdrawn from the vaporizer, and nitrogen, mixed with more or less oxygen, escapes at the top of the column. The gases are separately conveyed through the liquefier and exchanger to cool the incoming air by transfer of heat to the outgoing gases.

It will be appreciated as this description proceeds that, while the method described is the most efficient heretofare known, for the purpose, it is subject to a number of disadvantages, which prevent the highest efficiency and which I propose to overcome as hereinafter set forth. For example, although the gaseous mixture is primarily compressed to about thirty atmospheres at great expense, the products of the separation are discharged at a pressure below three atmospheres without recovery of energy except for three to four per cent delivered by the expansion engine, and only one gas is recovered in a substantially pure condition, the other, in this case, nitrogen, carrying upward to six per cent of oxygen. The mixture of this oxygen with the proportion of nitrogen required by the composition of air, amounts to substantially twenty-four per cent of the air originally entering the apparatus, and is discharged with the remaining nitrogen to the atmosphere. A relatively large portion of the air escapes, therefore, after compression, cooling, etc., without separation, and represents a material loss of energy.

I have discovered that the causes for the large loss of oxygen in the vapors leaving the top of the rectification column are not due to mechanical imperfections of the apparatus, but are inherent in the rectification method, which requires the liquefaction of all of the gaseous mixture. In any rectification method, maximum efficiency requires that the relative amounts of ascending vapor and descending liquid in the rectification column be such, that at the top and bottom the vapor has a composition closely approaching that necessary for phase equilibrium with the liquid at those levels. We may assume that the composition of the first or liquid rich in oxygen includes substantially forty-seven per cent, of oxygen. This is the liquid composition necessary for phase equilibrium with the incoming air at the base of the column, and thus represents the maximum possible enrichment in oxygen attainable without further rectification.

If any of the second or high nitrogen liquid be admitted to the rectification chamber above the inlet for liquid rich in oxygen, it is certain, if pure oxygen is to be obtained, that the upward passing vapor must vaporize an amount of this liquid equivalent to its nitrogen content, being in part liquefied thereby. The result of this liquefaction of the upwardly passing vapor is the production, at the entrance level of the first liquid, of a downwardly flowing liquid which is enriched in oxygen. The limiting composition of this liquid will be the same as that of the first liquid and will be attained only if the amount of the upwardly passing vapor liquefied by the second liquid entering at the top of the rectifier does not exceed a certain definite amount.

In the method under discussion, the amount of available nitrogen liquid is in excess of that required to produce the equilibrium composition at the lower inlet and if we allow nothing but pure nitrogen to escape at the top, the liquid passing downwardly will contain all of the oxygen of the original air mixed with 4 to 5% of argon which must appear at the bottom of the rectification chamber. On the other hand, if we vaporize an amount of liquid sufficient to insure the production of nothing but pure oxygen at the bottom, the amount of downwardly flowing liquid is insufficient to liquefy the oxygen in the vapor and oxygen will appear at the top. It is apparent, therefore, that it is impossible to obtain pure oxygen without considerable loss of oxygen in the effluent gas from the operation of this method if all of the nitrogen liquid is admitted at the top of the column.

The losses in the method described, which are due to "throttling" have already been mentioned. We have seen, for example, that the pressure in the rectification column must be low enough to enable liquid oxygen at the reduced pressure to condense pure nitrogen at a higher pressure inside the vertical tubes of the vaporizer, this difference of pressure being accomplished by "throttling" through the two pressure reducing valves employed, and that all of the nitrogen is liquefied.

To separate a mixture of two gases into its consituents, the theoretic minimum of work required depends upon the partial pressures exerted by the two constituents during an isothermal compression of each constitutent up to a pressure equal to that exerted by the mixed gases, by means of a piston impermeable to one and permeable to the other. This work is thus independent of the difference between the condensation pressures of either constituent at any temperature. If the difference of pressure maintained between opposite sides of an expansion device is such that the loss of available energy in the fluid mixture, because of the lowering of the pressure thereof, is just equal to the theoretic work of separation, then, since the latter work is theoretically recoverable, the whole operation is reversible and it will be just possible theoretically to completely separate the two constituents, by reversibly lowering the pressure on all the liquids produced to the pressures required. If, however, the loss of available energy by the lowering of pressure is greater than the theoretic work required for separation, there is a net amount of available energy expended by that operation.

In this discussion, the assumption is made that the lowering of pressure upon the liquid is accomplished reversibly, i. e., this decrease of pressure occurs by reason of the liquid acting as the working substance of an ideal adiabatic engine or liquid motor and thus the dissipation of available energy resulting in the actual case from the irreversible expansion through the reducing valves, is neglected. This dissipation of available energy is regarded as inevitable on account of the impracticability of employing a reversible engine to "expand" the liquid under the conditions prevailing.

The excess liquid "throttled" in rectification by the method described in which all of the liquid is "throttled" over and above that amount necessary to accomplish complete separation, carries a definite amount of available energy, which becomes irrecoverable. This dissipation of available energy reduces the efficiency of the method and thus adds to its cost of operation. The efficiency of the method is further reduced by "throttling" the liquid produced in the liquefier from the pressure delivered by the compressor down to that prevailing inside the lower end of the column.

I have discovered that these difficulties may be readily overcome and that the liquefaction and separation of gaseous mixtures may be improved to eliminate many of the losses heretofore experienced. My improved method will first be outlined to give a general view thereof, after which the details of operation will be clearer and will be more fully set forth with reference to the drawing.

Primarily, my invention rests upon the idea of liquefying only a portion of a gaseous mixture, this being accomplished at the initial pressure, i. e., as delivered by the compressor. The mixture treated may, for purposes of illustration, be considered as air, although the same principles are applicable to other gaseous mixtures. The portion liquefied will carry all of the oxygen contained in the original mixture, together with some of the nitrogen and argon the theoretical possible upper limit of oxygen content in the liquid being substantially 47 per cent, which is the composition of liquid necessary for phase equilibrium with vapor of air composition. The remaining gas consisting substantially of nitrogen, and argon will be withdrawn from the apparatus at the initial pressure. The nitrogen, which will carry a small amount of argon, may be used for any of the purposes to which it is adapted without further rectification or other treatment.

The liquid portion will then be rectified by subjecting it in a suitable column to direct contact with vapors arising from a vaporizer, containing substantially pure liquid oxygen resulting from the rectification. The evaporating oxygen serves, by heat interchange, to liquefy a portion of the incoming air as hereinbefore explained, and the rectifying column may be maintained at a pressure somewhat below that of the incoming air, the difference in pressure being produced by the necessary "throttling" of the liquid discharged into the column from the receptacle in which it is accumulated. This difference of pressure between the liquid oxygen surrounding the vertical tubes of the vaporizer and the gases passing upward in those tubes must be sufficient to enable liquid oxygen to cause, by indirect contact, condensation of the ascending gases in said tubes. I do not propose, however, to liquefy the substantially pure nitrogen leaving the top of the tubular system, and it is clear, therefore, that a smaller degree of "throttling" of the liquid will be required, than is necessary in earlier methods where the liquid oxygen is called upon to condense substantially pure nitrogen.

Since the composition of the liquid discharged into the column is substantially that determined by phase equilibrium with gaseous air, the effluent from the top of the rectification column will be air and may, after serving to cool the incoming air, be discharged to the atmosphere. As hereinafter explained, I contemplate "cycling" this air in the system so that all of the air passing through the apparatus is eventually separated into its constituents. The liquid passing through the reducing valve will thus include that derived from the air which has been returned to the apparatus by "cycling", in addition to that derived from air taken into the system by the compressor. The amount of available energy expended by reason of the "throttling" operation upon this liquid becomes as nearly equal as possible to the theoretically recoverable work of completely separating the two constituent gases of the mixture treated, i. e., the whole operation is rendered as nearly reversible as is practicable and hence its thermodynamic efficiency will approach as closely as possible the theoretic maximum.

Substantially pure oxygen is withdrawn from the vaporizer, hereinbefore referred to, and because of the simplification of the rectifying operation, it is possible to produce oxygen of a purity of 99 per cent or better, without excessive loss of oxygen, a result which has not been heretofore achieved. The oxygen escapes at a pressure somewhat below the initial pressure and may be stored and used in the ordinary manner.

In carrying out my method, I utilize and extend the principle of expansion after liquefaction as described and claimed in the application for Letters Patent of Montague H. Roberts and Claude C. Van Nuys, Serial No. 280,515, filed March 4, 1919, patented May 12, 1925, No. 1,537,193. This application involves the discovery of the advantages of liquefaction at the initial pressure and subsequent expansion of the separated products. As has been previously noted, the nitrogen is delivered from the column at the initial pressure of the incoming air and the oxygen and effluent air escape at a slightly lower presure. These gases are very cold and of substantially the same temperature. The low temperature is transferred to incoming air and the gases thus warmed and at high pressure are capable of expansion, in suitable engines, to recover a large part of the energy, originally expended in bringing the air to its initial pressure. This energy may be employed in compressing further quantities of air, the energy lost in the apparatus being made up from an external source. Preferably only the nitrogen and oxygen are thus expanded in carrying out my method. The low temperature of these gases, developed by expansion, is utilized in cooling the column and interchangers to make up liquid evaporated by the heat leakage through the walls thereof.

I also utilize and extend the principle of cooling of the incoming gaseous mixture prior to compression as described and claimed in the application for Letters Patent of Montague H. Roberts and Claude C. Van Nuys, Serial No. 289,099, filed April 10, 1919. The latter application involves the discovery that the work required in compressing a quantity of gas corresponding to a predetermined effluent volume is reduced if the gas is cooled prior to compression. I, therefore, employ an exchanger of temperature, in which the air prior to primary compression is subjected to heat interchange with a cold gas leaving the system, this arrangement making it possible to utilize efficiently any excess refrigerant effect of the system over and above that necessary to maintain the low temperatures required in the liquefaction operation. The air thus cooled is compressed, preferably in a single stage compressor, and is cooled in an intercooler supplied with circulating water.

As noted, the effluent air from the column is at high pressure, and, even after its heat interchange with incoming air, is still at low temperature. I propose to mix this effluent air with the incoming air from the first compression, thus cooling the mixture, which is then further compressed to the desired pressure, preferably in a single stage compressor. After being cooled in an aftercooler supplied with circulating water, the incoming air passes to the exchanger for further cooling by the gases from the column before entering the latter. By operating as described and avoiding as far as possible all irreversible temperature drops between media at widely varying temperature, I am enabled to closely approach the theoretically possible thermodynamic efficiency in a liquefaction system, thus reducing materially the cost of recovering the constituent gases.

In starting the operation, the apparatus is, of course, at atmospheric temperature and there is no liquid collected, so that it is necessary to reduce the temperature of the apparatus to that required for liquefaction and to produce a supply of liquid before the normal operation is commenced, I provide, therefore, for the expansion of compressed air in the engines until the system is sufficiently cooled and a supply of liquid has accumulated.

The details of operation, including starting, will be more clearly understood by reference to the drawing. The rectification column comprises a shell 5 divided by partitions 6, 7 and 8 to provide a pot 9, a gas chamber 10, a liquid chamber 11, and a rectification chamber 12. A plurality of tubes 13, passing through the partitions 6 and 7 and terminating in a head 14, are adapted to permit passage of gas from the pot 9 to the head, in indirect contact with gas in the chamber 10 and liquid in the chamber 11. A plurality of baffles 15 are disposed within the chamber 10 to direct the passage of gas therein downwardly and about the tubes 13, and a supplemental receiver 16 for liquid is supported within the chamber 11 so that liquid overflowing therefrom collects in the bottom of the chamber. The rectification chamber 12 is provided with a plurality of baffles 17 having gas outlets 18 and caps 19 which permit the upward passage of gases through the baffles and the layers of liquid are maintained thereon.

This liquid is delivered to the rectification chamber 12 through a pipe 20, having a pressure reducing valve 21 therein and communicating with the bottom of the pot 9 in which liquid accumulates as hereinafter described. The liquid flowing downwardly over the baffles 17 gradually gives up its more readily vaporizable constituent and is finally delivered through a pipe 22 to the receiver 16. The liquid in the receiver 16 is evaporated by heat transferred from gas passing through the tubes 13 and the vapor thus released passes upwardly through the rectification chamber 12, where it is joined by the more readily vaporizable constituent released from the liquid, while the more readily liquefiable constituent therein joins the liquid flowing down through the rectification chamber and is returned to the receiver 16.

The gaseous effluent escapes from the rectification chamber 12 through a pipe 23. The liquid accumulating in the bottom of the chamber 11 comprises one of the constituents of the gaseous mixture treated, in a substantially pure condition and, being vaporized by heat derived from the gaseous mixture passing through the tubes 13, it escapes through a pipe 24. The gaseous mixture, to be liquefied and separated, is delivered to the pot 9 through a pipe 25 and in passing through the tubes 13, a portion only of the gas is liquefied and drops into the pot, the residual gas being delivered to the head 14 and escaping through a pipe 26. There are thus three separate gases delivered from the column and if air is the gaseous mixture treated, the effluent gas delivered through the pipe 23 will have substantially the composition of air, while substantially pure oxygen and nitrogen are respectively delivered through the pipes 24 and 26. These gases are extremely cold and serve as a cooling medium for the incoming gaseous mixture.

I, therefore, provide an exchanger 27 in which the incoming gaseous mixture is subjected to heat interchange with the various products of the column. The exchanger comprises a shell 28 divided into sections A, B, C and D, each section comprising a plurality of tubes 29 and 30 and a plurality of baffles 31 which cause the incoming gaseous mixture surrounding the tubes to travel back and forth across the section as it advances. The pipe 25 is connected to the section A of the exchanger so that the gaseous mixture, after circulating about the baffles 31, is delivered thereto and thence to the pot 9. The pipes 23 and 24, and a pipe 32 communicating with the chamber 10 of the column, are connected to chambers 33, 34 and 35 at one end of the section A of the exchanger with each of which a number of tubes 30 communicate. The pipe 26 is similarly connected to a chamber 36 at the end of the section A with which the pipes 29 communicate. Thus, all of the products of the column are separately delivered to and pass through the tubes 29 and 30 in indirect contact with the incoming gaseous mixture.

The tubes 30 of section A deliver the several gases to chambers 37, 38 and 39, intermediate sections A and B of the exchanger and thence to the tubes 30 of section B. The gas passing through the tubes 29 in the section A is delivered to a chamber 40 and thence through a pipe 41 to a chamber 42 communicating with the tubes 29 of the section B. A pipe 43 delivers the incoming gaseous mixture from the section B to the section A. The tubes 30 terminate in chambers 44, 45 and 46 intermediate the sections B and C and the tubes 29 terminate in a chamber 47 similarly disposed.

The gas in the chamber 47 is delivered through a pipe 48 to a corresponding chamber 49 in the section C of the exchanger. A portion of the gas, which in the treatment of air, is substantially pure nitrogen is withdrawn through a pipe 50, controlled by a valve 51, and is delivered to an engine 52 where it is expanded with external work and thereby cooled. Thence the gas passes through a pipe 53 to the chamber 10 of the column and the cold produced by expansion is utilized therein in the preliminary liquefaction of the gaseous mixture. The cold gas circulates about the baffles 15 and escapes through the pipe 32 to the exchanger.

From the chamber 45 of the section B of the exchanger, the gas is conveyed through a pipe 54 to a chamber 55, with which tubes 30 of section C communicate. A pipe 56 conveys gas from the chamber 46 to a chamber 57 with which tubes 30 of section C also communicate. Tubes 29 of section C communicate with the chamber 49 receiving a portion of the gas from the chamber 47. A pipe 58 conveys gas from the section C of the exchanger to the section B, after the gas has passed about the baffles 31 therein. The tubes 30 deliver the gases passing therethrough to chambers 59 and 60 intermediate the sections C and D of the exchanger, and the tubes 29 deliver the gas conveyed thereby to a chamber 61. The gas from the chamber 61 is delivered through a pipe 62 to a chamber 63 in the section D of the exchanger. The tubes 29 of section D communicate with the chamber 63 and the tubes 30 with the chambers 59 and 60. The gaseous mixture in the section D escapes through a pipe 64 to the section C. The gases are delivered by the pipes 29 to a chamber 65 and by the pipes 30 to chambers 66 and 67 at the end of the exchanger.

From the chambers 65, the gas, which, in the treatment of air, is substantially pure nitrogen is withdrawn through a pipe 68 controlled by a valve 69 and is delivered to an engine 70, where it is expanded with external work and is delivered through a pipe 71 to the chamber 57 of the exchanger where it mixes with the gas previously expanded in the engine 52 and entering through the pipe 56. The cold produced by the expansion of the gas in the engine 70 is thus utilized in cooling the incoming gaseous mixture. A portion of this cold gas is drawn from the engine 70 to a pipe 72 controlled by a valve 73 and is delivered to an exchanger 74 as hereinafter described.

Gas from the chamber 66 at the end of the exchanger, which, in the treatment of air is substantially pure oxygen, is withdrawn through a pipe 75 controlled by a valve 76 and is delivered to an engine 77 where it is expanded with external work and delivered through a pipe 78 controlled by a valve 79 to the exchanger 74. The exchanger 74 is employed in precooling the incoming gaseous mixture and comprises a shell 80 and a plurality of tubes 81 terminating in chambers 82 and 83. The gaseous mixture enters the shell 80 through a pipe 84 and is delivered therefrom through a pipe 85. The pipes 72 and 78 supply cold gases from the engines 70 and 77 to the chambers 82 and 83, and the gases pass through the tubes 81 to the opposite chambers 82 and 83 from which they escape through pipes 86 and 87. The incoming gaseous mixture is thus cooled by indirect contact with cold products from the column and the precooling thus accomplished causes a preliminary condensation of the gaseous mixture. Thus it is possible for the compressors, as hereinafter described, to handle a considerably greater volume of gas than would be possible if the gas entered at normal atmospheric temperature.

The cold gaseous mixture is delivered from the pipe 85 to a single stage compressor 89, where it is initially compressed. The compressed gaseous mixture escapes through a pipe 90 to an intercooler 91 in which the gaseous mixture is cooled by indirect contact with water. Thence the gas passes through a pipe 92 to a compressor 93. A pipe 94 controlled by a valve 95 conveys gas which, in the treatment of air, is the effluent, escaping from the top of the rectification column and having substantially the composition of air, to the pipe 92 where it mixes with the incoming gaseous mixture. The gas delivered through the pipe 94 is very cold and serves, by mixing with the incoming compressed gaseous mixture to precool the latter in a manner similar to the precooling in the exchanger 74 with a corresponding effect upon the capacity of the compressor 93. From the compressor 93 the gaseous mixture is delivered to a pipe 96 to an aftercooler 97 where it is subjected to the cooling action of water and is thence conveyed to a pipe 98 to the section D of the exchanger 27. In the exchanger, as previously described, the gaseous mixture is cooled by heat interchange with the various products of the column and is finally delivered at an extremely low temperature through the pipe 25 to the pot 9. The gas in the chamber 67 at the end of the exchanger 27 which has been previously expanded in the engines 52 and 70, escapes through a pipe 99.

Obviously in starting the operation, the entire system is at atmospheric temperature and the desired low temperature must be established by the expansion of the previously compressed gaseous mixture. For this purpose I provide a by-pass 100 controlled by a valve 101 and connecting the pipes 50 and 94 and a by-pass 102 controlled by a valve 103 connecting the pipes 72 and 78. In starting, the valves 101 and 103 are opened and the valves 73, 79 and 95 are closed, while a valve 104 in the pipe 71 is opened fully, it being partially closed in normal operation.

The gaseous mixture, after compression and passage through the exchanger 27, enters the column through the pipe 25. A portion thereof escapes through the pipe 23 and another portion leaves through the pipe 24, the remainder being delivered through the pipe 26. The gaseous mixture reentering the exchanger 27 from the pipe 26 passes through the tubes 29 of sections A and B, and a portion is withdrawn and expanded in the engine 52, and is thereby cooled. The cooled gaseous mixture passes through the pipe 53 to the chamber 10 causing the progressive cooling of the incoming gaseous mixture in the tubes 73. The gaseous mixture escaping from the chamber 10 through the pipe 32 travels through tubes 30 of the exchanger and is finally delivered through the pipe 99.

Another portion of the gaseous mixture from the pipe 26 is withdrawn, after passage through the tubes 29 of sections C and D of the exchanger, and is delivered through the pipe 68 to the engine 70 where it is expanded and thereby cooled. The cooled gaseous mixture is delivered by the pipe 71 to the exchanger 27 and, mixing with the expanded product of the engine 52, it passes through the tubes 30 in sections C and D to the pipe 99.

The gaseous mixture from the pipe 23 passes through the tubes 30 in sections A and B of exchanger 27 and is delivered by the pipe 94 and by-pass 100 to the engine 52, joining the gaseous mixture from the pipe 26 before expansion in the engine. The gaseous mixture from the pipe 24 after passing through the tubes 30 in all sections of the exchanger 27 is delivered by the pipe 75 to the engine 77 where it is expanded and cooled. The cooled gaseous mixture is delivered through the pipe 78, by-pass 102 and pipe 72 and 71 to the exchanger 27, mixing with the expanded gaseous mixture from the engine 70 and after passing through the tubes 30 in sections C and D of exchanger 27, the gaseous mixture escapes through the pipe 99.

It will be apparent that in starting, all of the gaseous mixture is expanded after compression and that cooling of the gaseous mixture is thus progressively carried on until the desired low temperature is attained and liquid is deposited in the pot 9. The method is particularly effective in starting, the temperatures falling rapidly so that the method is in full operation in a much shorter time than is possible with previously known methods. Of course, when the desired temperatures have been attained the valves are readjusted to the normal working conditions as previously described.

With the arrangement of the apparatus clearly in mind, it will be apparent that the proposed method of liquefaction involves numerous novel principles which distinguish it from methods heretofore employed in the liquefaction and rectification of gases. Assuming that the method is in operation and that air is being treated, it will be noted that the air is subjected in the column to cooling by indirect contact, first, with the cold gaseous product and subsequently by contact with an evaporating liquid so that the more liquefiable constituent is separated and flows into the pot 9, while the residual gas which is substantially pure nitrogen passes off through the pipe 26. During the liquefaction operation, there is no release from the pressure of the gaseous mixture and consequently the nitrogen escapes from the column at its initial pressure and after giving up its cold, it is expanded in suitable engines to recover a large proportion of the energy originally employed in bringing the gaseous mixture to the initial pressure. The nitrogen is, moreover, withdrawn from the cycle, so far as the further treatment of the gaseous mixture is concerned and is never liquefied. The liquid accumulating in the pot 9 is substantially 47% oxygen and is delivered through the pipe 20 with slight throttling by the valve 21 to the rectification chamber 12 of the column.

The effluent gas escaping through the pipe 23 from the column has the equilibrium composition for a liquid such as is deposited in the pot 9 and consequently this effluent gas corresponds in composition to atmospheric air. The effluent gas is extremely cold and after passing through the exchanger it may be discharged to the atmosphere through a valved outlet 95'. However, as above noted, it is preferably employed while still in a cold condition and at a pressure of the upper part of the column to precool the gaseous mixture before the latter passes to the second compressor. The liquid passing down through the rectification compartment 12 meets vapors arising from the liquid in the receptacle 16 so that nitrogen is gradually separated from the liquid which finally arrives in the bottom of the chamber 11 as substantially pure liquid oxygen. The liquid is there vaporized and escapes through the pipe 24. It will be here noted that both oxygen and nitrogen in a substantially pure condition are delivered from the column, and that the separation is accomplished without an excessive pressure drop.

The oxygen escaping through the pipe 24 and air escaping through the pipe 23 at very nearly the initial pressure of the incoming air. The oxygen, being at high pressure, may, after it has been warmed by indirect contact with the incoming air, be expanded in a suitable engine to recover the portion of the energy originally expended in compressing the incoming air, the recovery of energy from this source when combined with that recovered by the expansion of nitrogen delivered from the column, comprising the major portion of the energy originally employed in compressing the air.

The energy recovered in the various engines in starting as well as in normal operation, may be utilized in driving the compressors and inasmuch as the energy recovered is a material proportion of that employed in the initial compression there is a marked saving in operation. Precooling of the gas before compression introduces a further saving and the elimination of one constituent, for example, nitrogen, without liquefaction completes the possible economic advantages to be effected in a liquefaction operation.

The pressures and temperatures attained in the practice of the method will depend upon well known principles of liquefaction and will vary with gaseous mixtures of different character. It will not be necessary, however, to employ initial pressures as high as has been heretofore essential, nor will the temperatures be so low as is required when all of the gaseous mixture treated must be liquefied. Because they are subject to wide variation no attempt is made herein to set forth in detail the pressures and temperature employed. It is sufficient to note that in the treatment of air, initial pressures upward to 30 atmospheres will be quite sufficient and that a temperature well above the critical temperature of nitrogen may be developed for example—156° C. in the liquefaction zone.

I am aware that various changes may be made in the method herein described wtihout departing from the invention or sacrificing any of its material advantages and I desire, therefore, to claim broadly all of the steps and combinations thereof whereby the effective separation of gaseous mixtures in accordance with my method is accomplished.

I claim:—

1. In the separation of the constituents of a gaseous mixture the method which comprises subjecting the mixture to a liquefying operation whereby a liquid containing said constituents is formed, leaving a portion of one of said constituents as a residual gas, withdrawing and expanding the residual gas, causing it to travel in indirect contact with the gaseous mixture to be liquefied, rectifying the liquid produced by the liquefying operation to produce a liquid containing one of the constituents in substantial purity and an effluent having substantially the composition of the original gaseous mixture, vaporizing the liquid thus produced and separately withdrawing the vapor and the effluent.

2. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, warming said residual gas by heat interchange with said mixture, successively expanding separate portions of said residual gas and utilizing the cold expanded product to maintain the required low temperature.

3. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, evaporating the liquid product of the rectification, warming the evaporate and said residual gas by heat interchange with said mixture, separately expanding said evaporate and residual gas and utilizing the cold expanded products to maintain the required low temperature.

4. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, evaporating the liquid product of the rectification, warming the evaporate and residual gas by heat interchange with said mixture, expanding said evaporate, successively expanding separate portions of said residual gas and utilizing the cold expanded products to maintain the required low temperature.

5. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, and withdrawing an effluent gas following rectification, said effluent gas having substantially the composition of said mixture.

6. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture and cycling said effluent gas with further quantities of said mixture.

7. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture, and adding said effluent gas to said mixture after the latter has been initially compressed.

8. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture, warming said effluent gas by heat interchange with said mixture and adding said effluent gas to said mixture after the latter has been initially compressed.

9. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture, evaporating the liquid product of the rectification, expanding the evaporate and utilizing the cold of said effluent gas and evaporate to reduce the external work of compressing the mixture.

10. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture, evaporating the liquid product of the rectification, conveying the evaporate and said effluent gas in heat interchanging relation with the mixture, expanding said evaporate and utilizing the cold of said evaporate and effluent gas to reduce the external work of compressing the mixture.

11. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, withdrawing an effluent gas following rectification, said effluent gas having substantially the composition of said mixture, and adding said effluent gas to said mixture after initial and before final compression thereof.

12. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, evaporating the liquid product of the rectification, warming the evaporate by heat interchange with said mixture, expanding the evaporate, utilizing the cold expanded product to cool said mixture before initial compression thereof, withdrawing an effluent gas following said rectification, said effluent gas having substantially the composition of said mixture and adding said effluent gas to said mixture after said initial compression.

13. In the separation of the constituents of a gaseous mixture, the method which comprises, subjecting the mixture to a liquefying operation whereby a liquid containing said constituents is formed, leaving a portion of one of said constituents as a residual gas, withdrawing said residual gas, rectifying said liquid, to produce a liquid consisting substantially of one constituent of said mixture and an effluent gas having substantially the composition of said mixture.

14. In the separation of the constituents of a gaseous mixture, the method which comprises, subjecting the mixture to compression, then to heat interchange, first with gaseous separation products, and then with liquid separation products to liquefy a portion of said mixture leaving a residual gas, withdrawing said residual gas and subjecting the liquid to direct contact with vapors arising from a body thereof to separate an effluent gaseous product having substantially the composition of said mixture.

15. In the separation of the constituents of a gaseous mixture, the method which comprises, subjecting the mixture to compression, then at the pressure developed to heat interchange, first with gaseous separation products, and then with liquid separation products to liquefy a portion of said mixture leaving a residual gas, withdrawing said residual gas, rectifying the liquid produced to separate an effluent gas having substantially the composition of said mixture and a liquid consisting substantially of one of the constituents and evaporating the latter liquid.

16. In the separation of the constituents of a gaseous mixture, the method which comprises, subjecting the mixture to compression, then at the pressure developed to heat interchange, first with gaseous separation products, and then with liquid separation products to liquefy a portion of said mixture leaving a residual gas, withdrawing said residual gas, rectifying the liquid produced to separate an effluent gas having substantially the composition of said mixture and a liquid consisting substantially of one of the constituents, evaporating the latter liquid, and adding said effluent gas to the incoming mixture.

17. In the separation of the constituents of a gaseous mixture, the method which comprises, subjecting the mixture to compression, then to liquefaction at the pressure developed to separate a liquid from a residual gas consisting substantially of one of said constituents, withdrawing said residual gas at said pressure, warming said gas by heat interchange with said mixture, expanding said gas to recover the energy stored therein, rectifying the liquid to separate another constituent as a liquid, evaporating the latter liquid, warming the evaporate by heat interchange with said mixture and expanding said evaporate to recover the energy stored therein.

18. In the separation of the constituents of a gaseous mixture, the method which comprises, liquefying a portion of said mixture leaving a residual gas consisting substantially of one constituent, expanding the residual gas, causing it to travel in indirect contact with the gaseous mixture to be liquefied, rectifying the liquid produced to enrich the latter in another constituent, evaporating the enriched liquid and separately withdrawing the two constituents and an unseparated mixture thereof having substantially the composition of the original mixture.

19. In the separation of the constituents of a gaseous mixture, the method which comprises, separating a residual gas consisting substantially of one constituent, by liquefying a portion of said gas with the remaining constituents, expanding the residual gas, causing it to travel in indirect contact with the gaseous mixture to be liquefied, rectifying the liquid to separate therefrom an effluent mixture containing both constituents, thereby leaving a new liquid consisting substantially of a second constituent, vaporizing the latter liquid and separately withdrawing the two gaseous constituents and said effluent mixture having substantially the composition of the original mixture.

20. In the separation of the constituents of a gaseous mixture, the method which comprises, separating a residual gas consisting substantially of one constituent, by liquefying a portion of said gas with the remaining constituent, rectifying the liquid to separate therefrom an effluent mixture containing both constituents in substantially the proportions of the original mixture, thereby leaving a new liquid consisting substantially of a second constituent, vaporizing the latter liquid, separately withdrawing the two gaseous constituents and said effluent mixture, and adding said effluent mixture to the incoming original mixture.

21. In the separation of the constituents of a gaseous mixture, the method which comprises, refrigerating said mixture to separate a residual gas and a liquid, rectifying the liquid and thereby separating an effluent corresponding in composition to the original mixture and cycling said effluent to ensure ultimate separation of the constituents thereof.

22. In the separation of the constituents of a gaseous mixture, the method which comprises, cooling said mixture, subjecting the cooled mixture to compression in independent stages, adding a cold product of the separation to said mixture between said stages and subsequently subjecting said mixture to a liquefying operation.

23. In the separation of the constituents of a gaseous mixture, the method which comprises, cooling said mixture, subjecting the cooled mixture to compression in independent stages, adding a cold product of the separation to said mixture between said stages, subsequently subjecting said mixture to a liquefying operation, whereby a liquid and a residual gas are produced, withdrawing said residual gas and rectifying said liquid.

24. In the separation of the constituents of a gaseous mixture, the method which comprises, subjecting said mixture to compression in two stages, then to a liquefaction operation, withdrawing and utilizing cold products of said operation to cool the mixture after final compression thereof, expanding said products, balancing said liquefaction operation by diverting more or less of the expanded product to cool said mixture before initial and after final compression thereof and adding another cold product to said mixture after initial compression thereof.

25. In the separation of the constituents of a gaseous mixture, the method which comprises, subjecting said mixture to a liquefaction operation to produce two products consisting respectively of two constituents and a third gaseous product corresponding substantially in composition to the original mixture, transferring heat from the mixture to said products, expanding the first two products to recover the energy stored therein and adding the third gaseous product to the incoming mixture.

In testimony whereof I affix my signature.

CLAUDE C. VAN NUYS.